(12) United States Patent
Manickchan et al.

(10) Patent No.: US 8,656,862 B2
(45) Date of Patent: Feb. 25, 2014

(54) AUTOMATIC ANIMAL FEEDING AND WATERING DEVICE

(76) Inventors: Navin Manickchan, Rousillac (TT); Byron Biswah, Gasparillo (TT)

( * ) Notice: Subject to any disclaimer, the term of this patent is extended or adjusted under 35 U.S.C. 154(b) by 0 days.

(21) Appl. No.: 13/280,651

(22) Filed: Oct. 25, 2011

(65) Prior Publication Data

US 2013/0098298 A1   Apr. 25, 2013

(51) Int. Cl.
*A01K 5/00* (2006.01)
*A01K 39/00* (2006.01)
*G01G 13/24* (2006.01)
*G01G 13/16* (2006.01)

(52) U.S. Cl.
USPC ............ 119/51.11; 119/51.01; 119/51.5; 119/53; 119/56.1; 119/57.1; 119/57.92; 177/70; 177/71; 177/105; 177/108; 177/115; 177/120

(58) Field of Classification Search
USPC .......... 119/51.01, 51.11, 51.5, 53, 56.1, 57.1, 119/57.92; 177/70, 71, 88, 105, 108, 115, 177/120, 145
See application file for complete search history.

(56) References Cited

U.S. PATENT DOCUMENTS

| | | | |
|---|---|---|---|
| 3,133,607 A * | 5/1964 | Gardner et al. ............. 177/108 |
| 3,528,588 A * | 9/1970 | Moore ............................ 406/63 |
| 3,678,902 A | 7/1972 | Ruth |
| 3,759,228 A | 9/1973 | Keen |
| 3,799,339 A * | 3/1974 | Breitholtz et al. ............ 209/639 |
| 3,962,997 A * | 6/1976 | Ruth ........................... 119/51.11 |
| 4,020,980 A | 5/1977 | Illes, Jr. |
| 4,051,812 A | 10/1977 | DeLoach et al. |
| 4,284,035 A | 8/1981 | White |
| 4,292,930 A | 10/1981 | Olsen |
| 4,324,203 A | 4/1982 | Chiappetti |
| 4,513,688 A | 4/1985 | Fassauer |
| 4,573,434 A | 3/1986 | Gardner |
| 4,722,300 A | 2/1988 | Walker et al. |
| 4,733,634 A | 3/1988 | Hooser |
| 5,150,664 A | 9/1992 | Kirk |
| 5,245,949 A | 9/1993 | Hively |
| 5,265,560 A | 11/1993 | Dobbins |
| 5,582,132 A | 12/1996 | Morton |
| 5,622,467 A | 4/1997 | Pethullis |
| 5,794,560 A | 8/1998 | Terenzi |
| 6,116,471 A | 9/2000 | Miller |
| 6,135,056 A * | 10/2000 | Kuo .......................... 119/51.11 |
| 6,196,158 B1 | 3/2001 | Yang |
| 6,227,143 B1 | 5/2001 | Papkov |
| 6,401,657 B1 | 6/2002 | Krishnamurthy |
| 6,427,628 B1 | 8/2002 | Reece |

(Continued)

*Primary Examiner* — Kimberly Berona
*Assistant Examiner* — Michael Wang
(74) *Attorney, Agent, or Firm* — Brown & Michaels, PC

(57) ABSTRACT

A device catering for the dietary needs of animals. Feed is stored in a hopper and distributed at intervals to the animal's feeding receptacle via an internal dispensing mechanism using a flexible rotor sealing against the walls of a housing to both meter the feed and seal against contamination. The quantities and delivery times may be set by the user. An optional weighting system can be provided to increase accuracy of delivered feed amounts. Optionally, the device may include a water delivery system. Water is provided by a plumbed domestic connection and is available to the animal at all times, except during the automatic change cycle. A pump is utilized to change the water several times a day, in an attempt to remove any contaminants that may affect the water quality that is required to be dispensed.

18 Claims, 22 Drawing Sheets

(56) References Cited

U.S. PATENT DOCUMENTS

| | | | |
|---|---|---|---|
| 6,494,448 B2 * | 12/2002 | Duhamel et al. | 271/187 |
| 6,681,718 B1 | 1/2004 | McIlarkey | |
| 6,928,954 B2 | 8/2005 | Krishnamurthy | |
| 7,152,550 B2 * | 12/2006 | Walker | 119/51.5 |
| 7,284,499 B1 * | 10/2007 | Kuster | 119/51.5 |
| 7,762,211 B1 | 7/2010 | McDaniel | |
| 2006/0196433 A1 | 9/2006 | Ness | |
| 2010/0122660 A1 * | 5/2010 | Willett | 119/51.5 |
| 2010/0162960 A1 * | 7/2010 | Moon | 119/51.02 |
| 2012/0145085 A1 * | 6/2012 | Massicotte | 119/51.11 |

\* cited by examiner

AUTOMATIC ANIMAL FEEDING AND WATERING DEVICE

BACKGROUND OF THE INVENTION

1. Field of the Invention

The present invention is directed to the field of automatic animal feeding and watering devices.

2. Description of Related Art

Animals cared for in a commercial setting, such as dogs owned by security companies, tend to benefit from multiple caretakers with sufficient human presence to ensure feed and water are delivered on time and in the quantities required. Pet owners, however, may not always be able to deliver this quality care either due to schedule or vacation. This poses a significant problem especially when the dog serves the dual purpose of being a pet and a guard of the property.

It is not feasible to remove the dog and place him in a shelter or by a friend since the property remains unguarded. The alternative entails getting someone familiar with the animal to attend to its dietary needs on a daily basis. This can prove quite challenging especially if the dog is temperamental and dangerous. The other limitation of this approach is that it allows others to be familiar with the property guard and poses a security risk.

Several patents have been filed to address the problem of animal feeding, however, they do fall short in one area or another.

There are several approaches to the metering and delivery of dry food. One of the simplest means is a basic flap opening under a hopper that is actuated by a solenoid or motor as presented in U.S. Pat. Nos. 4,733,634, 5,794,560 and 6,196,158. This system is simple but the likelihood of sealing the opening once it is opened is low since food pellets will inevitably become lodged between the sealing plate and hopper. In addition to this it is unlikely the same quantity of food will be reliably delivered when the hopper is full as opposed to nearly empty.

Rotating slotted disks have found favor with some designers. They work on the principle that a specified amount of food is captured and transported per rotation. Good examples of this approach are presented in U.S. Pat. Nos. 4,292,930, 4,324,203 and 6,427,628. These systems are relatively accurate but incur shear planes as they rotate. Should a food pellet become lodged at this interface two possible scenarios can occur; the pellet can be crushed or the mechanism can fail. Neither occurrence is of benefit with the consequences ranging from compromising the integrity and quantity of food delivered to a complete lack of food delivery and possible equipment damage. Should the food be crushed high vibration and wear on the equipment can be expected which will surely impact negatively on its useful life.

Rotating blade systems have also been proposed utilizing inflexible blades that direct feed either inward as illustrated in U.S. Pat. Nos. 4,020,980, 5,622,467 and 6,681,718 or outward, as illustrated in U.S. Pat. No. 4,513,688. These systems do eliminate the shear planes previously described. They are, however, incapable of providing an effective vapor seal and as such allow atmospheric humidity to compromise the integrity of the stored feed. This lack of seal also allows vermin to get into the feed.

Water pumps have been proposed to circulate water from a reservoir through filter media and into a consumption receptacle thereby improving the quality of water delivered to an animal. Good examples of this approach are seen in U.S. Pat. Nos. 7,762,211 and 6,928,954. While this method has its benefits it does not solve the problem of disposing of the organic particulate matter that collects in the water as an animal consumes. Instead of disposal the particulate matter is trapped in a filter and as such contaminates the water as it decomposes.

SUMMARY OF THE INVENTION

The present invention described is a device catering for the dietary needs of animals. Feed is stored in a hopper and distributed at intervals to the animal's feeding receptacle via an internal dispensing mechanism using a flexible rotor sealing against the walls of a housing to both meter the feed and seal against contamination. The quantities and delivery times may be set by the user. An optional weighting system can be provided to increase accuracy of delivered feed amounts.

Optionally, the device may include a water delivery system. Water is provided by a plumbed domestic connection and is available to the animal at all times, except during the automatic change cycle. A pump is utilized to change the water several times a day, in an attempt to remove any contaminants that may affect the water quality that is required to be dispensed.

DETAILED DESCRIPTION OF THE INVENTION

Figure 1:
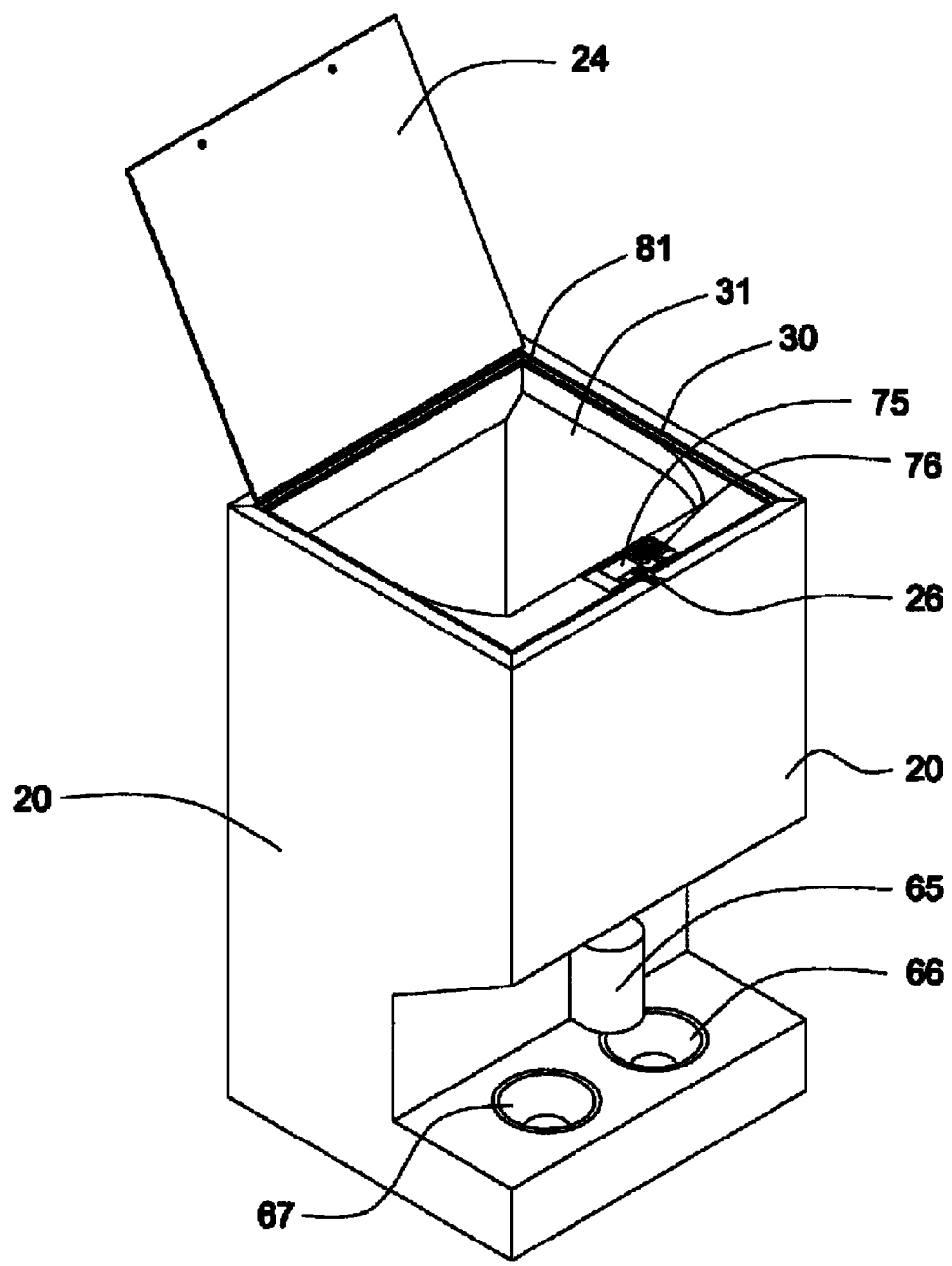
FIG. 1 is a frontal perspective view of the preferred embodiment of the present invention with the lid cover open.
Figure 2:
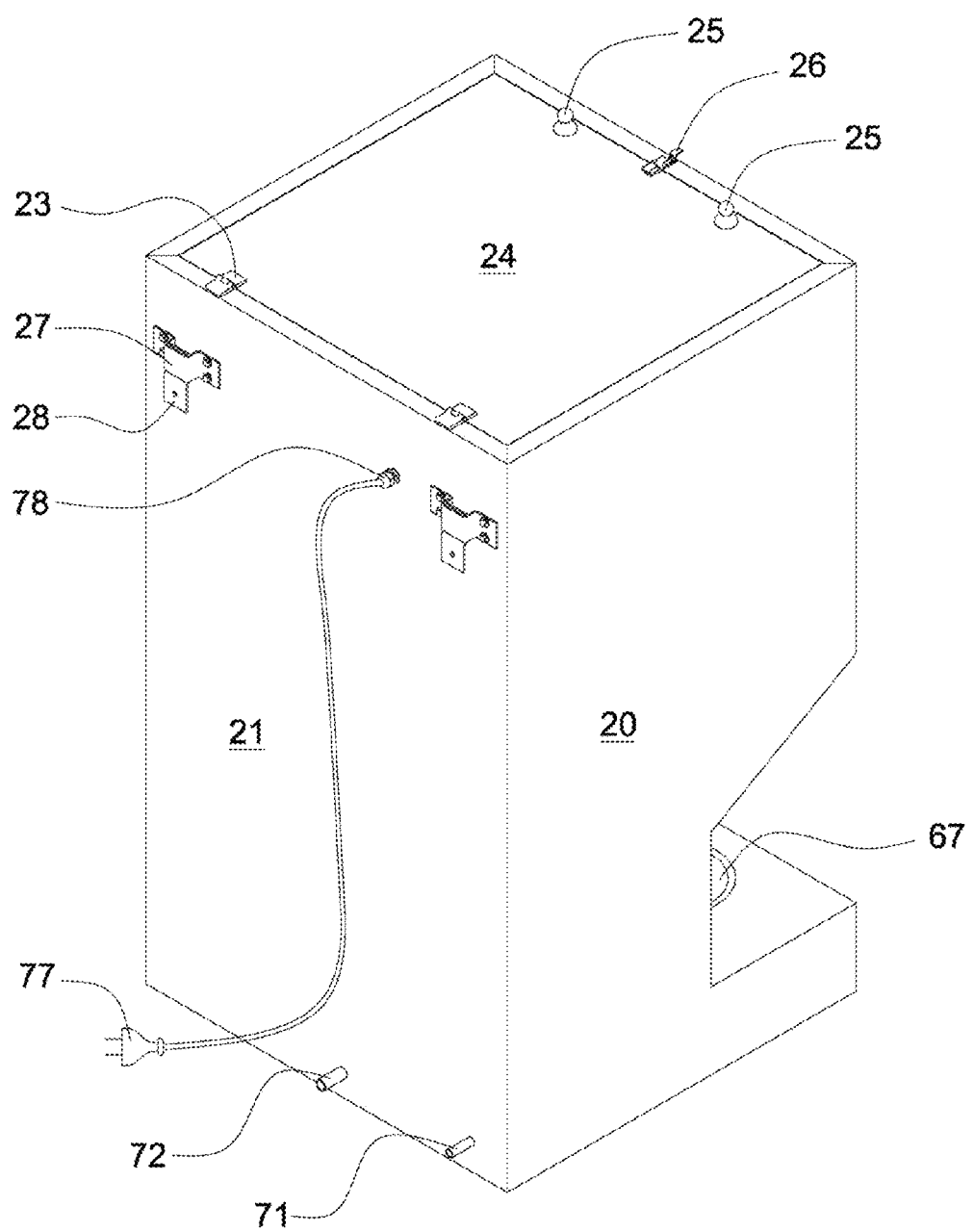
FIG. 2 is a rear perspective view of the preferred embodiment of the present invention.

Although a specific embodiment of the present invention will now be described with reference to the drawings, it should be understood that such embodiments are by way of example only and merely illustrative of but a small number of the many possible specific embodiments which can represent applications of the principles of the present invention.

Various changes and modifications, apparent to one skilled in the art, to which the present invention pertains, are deemed to be within the spirit, scope and contemplation of the present invention as further defined in the appended claims.

For the preferred embodiment of the present invention, the front 20 has an indented face to accommodate the animal during feeding. The feed 66 and water bowls 67 are located on a level platform created within the indented face. The chute shield 65 that covers the feed exit chute 64 (not shown) is visible. This piece is a finisher and serves in a solely aesthetic role.

The top access cover 24 is shown in an open position. As such the user interface, inclusive of the liquid crystal display 75 and keypad 76, is visible. One side of the cover latch 26, used to secure the top access cover against the rubber seal 30, is also visible. The force provided by the latch ensures a reliable seal is formed and maintained. This is important to ensure the integrity of the pelletized feed is not compromised due to exposure to the atmosphere. The cover latch 26 also allows the option to lock the device. Two sides of the hopper 31 are also visible from this angle. The open cover limit switch 81 is also indicated though it is barely visible due to scale.

A rear perspective view of the apparatus of the present invention shows the electrical connection 77, which utilizes a gland 78, to facilitate safe cable penetration through the rear body panel 21. The water supply connection 71 and drain connection 72 are also visible. The final items shown on the rear panel 21 are two part mounting brackets 27, 28.

One part of the wall mount bracket 27 mounts on to the rear body panel 21 while the other part 28 mounts on to a secure surface such as a wall. These mounting brackets 27, 28 ensure that the only way to move the device is by lifting, a task nearly impossible for any domestic animal. The hinges 23 for the top access cover 24 and the handles 25 are visible, as is the entire latch 26, shown in a locked position.

A cutaway perspective view of the apparatus of the present invention provides a good basis for understanding the spatial coordination between the independent systems and is best referenced as these systems are described in detail.

Figure 5:
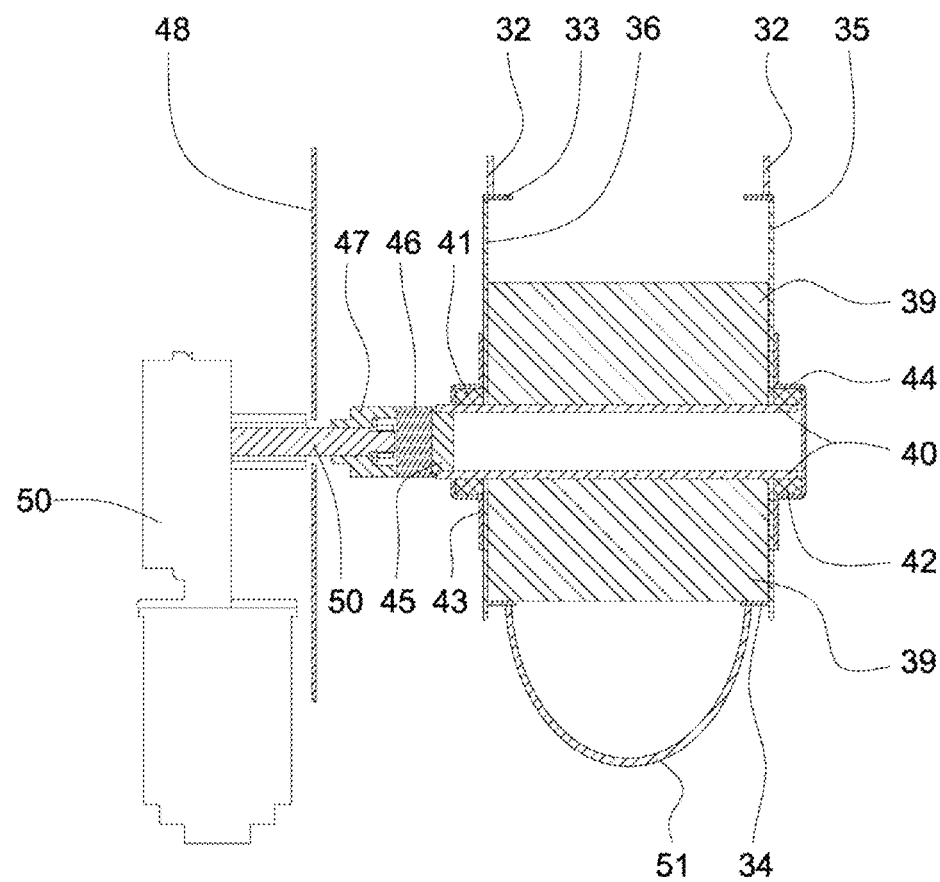
FIG. 5 is a cross-sectional view of the feed delivery mechanism, of the present invention, excluding the hopper, chutes and weighting system, taken perpendicular to the frontal face and through the centre line of the hopper.
Figure 6A:
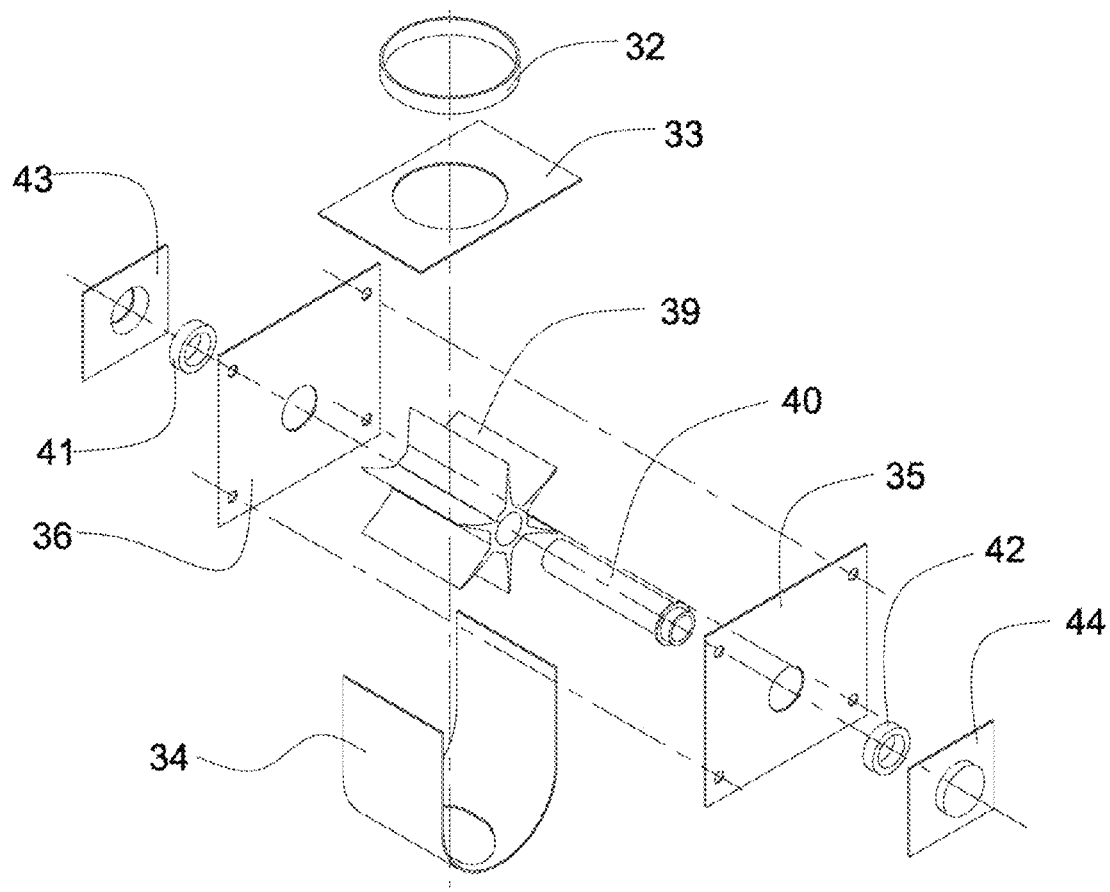
FIG. 6a is an exploded fragmentary perspective view of the feed delivery mechanism of the present invention, showing the rotor and associated housing components.
Figure 6B:
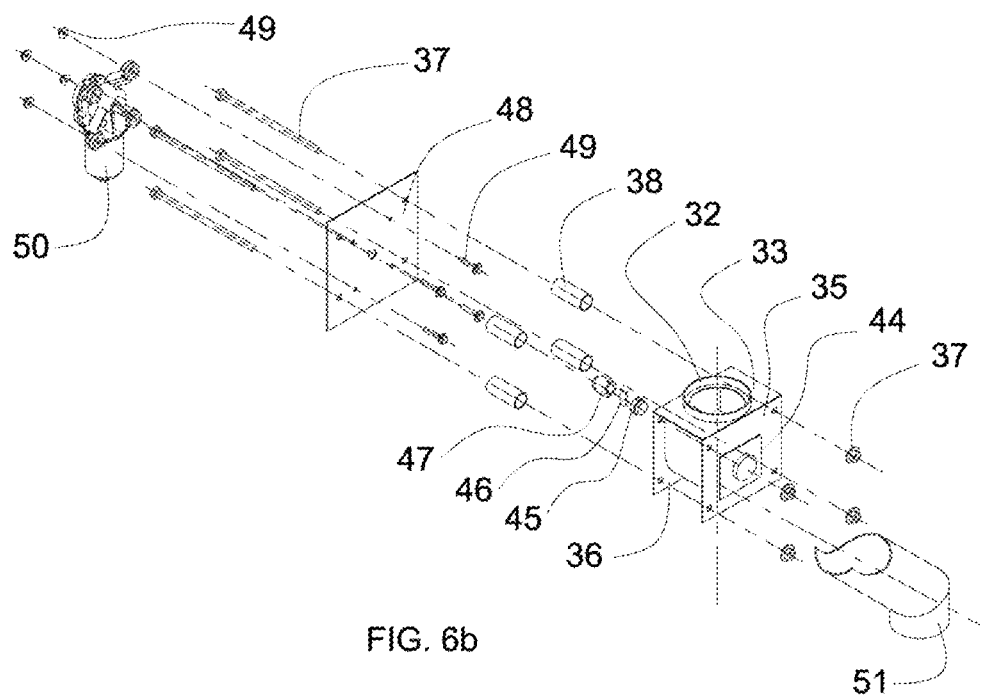
FIG. 6b is an exploded fragmentary perspective view of the feed delivery system of the present invention, inclusive of the motor and chute to the weighting system.
Figure 7:
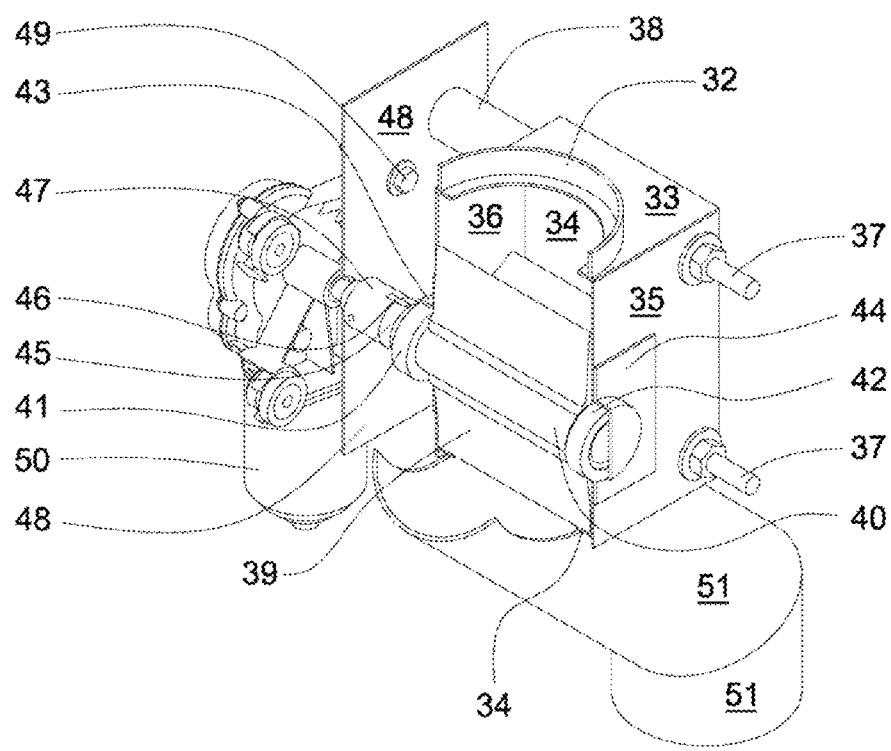
FIG. 7 is a fragmentary perspective view of the feed delivery system of the present invention.

In a section taken perpendicular to the front face 20, the latch 26 is shown in a closed position securing the top access cover 24 against the rubber seal 30, as mentioned previously. The liquid crystal display 75, circuit board 80 and transformer 79 are also visible. The delivery mechanism housing top ring 32 is included to allow some compliance between the hopper 31 and delivery mechanism thus allowing some flexibility in manufacturing. This arrangement ensures no pelletized feed escapes even if there is a small gap. Due to scale many components in the delivery mechanism are not clearly visible and as such an enlarged view of this system is provided in FIG. 5. The delivery system motor 50 and delivery motor mount plate 48 are labeled to reference the system. The placement of the section avoids much of the components in the weighting system and as such those shown appear to be floating.

For reference the scale pillow bearings 59 and scale release gate motor 57 are identified. The internal frame 83 was transected at several points and shows up as squares on the drawing. The water tank 68 is visible but this view provides little information. Finally it is noted that the bottom body panel 22 is shown with the frame bolted to it to transfer the weight of the supported components to the floor.

An enlarged view of the present invention shows the sectioned feed delivery system, excluding the hopper 31 and delivery system chute 51. Upon activation by the microprocessor controller 80 the delivery system motor 50 activates the rotor 39 via a rotor shaft 40 and three piece coupling system 45, 46, 47. The first piece of the coupling 47 is attached to the delivery system motor 50 shaft. The other piece 45 is attached to the rotor shaft 40. Mechanical coupling is achieved via a key 46. This arrangement allows for easy separation of the coupling and facilitates assembly and disassembly.

As is good practice, the rotor shaft 40 is supported at both ends by bushings 41, 42 which are in turn kept in position by housings 43, 44. Lateral movement of the rotor shaft 40 is restricted by a small lip on the shaft that allows bushing 42 to function as a thrust bushing. Movement in the opposite direction is prevented by the thrust bushing internal to the delivery system motor 50. The shape of the upper portion of the delivery system chute 51 allows it to form a seal against the curved portion of the mechanism's housing 34.

Figure 8:
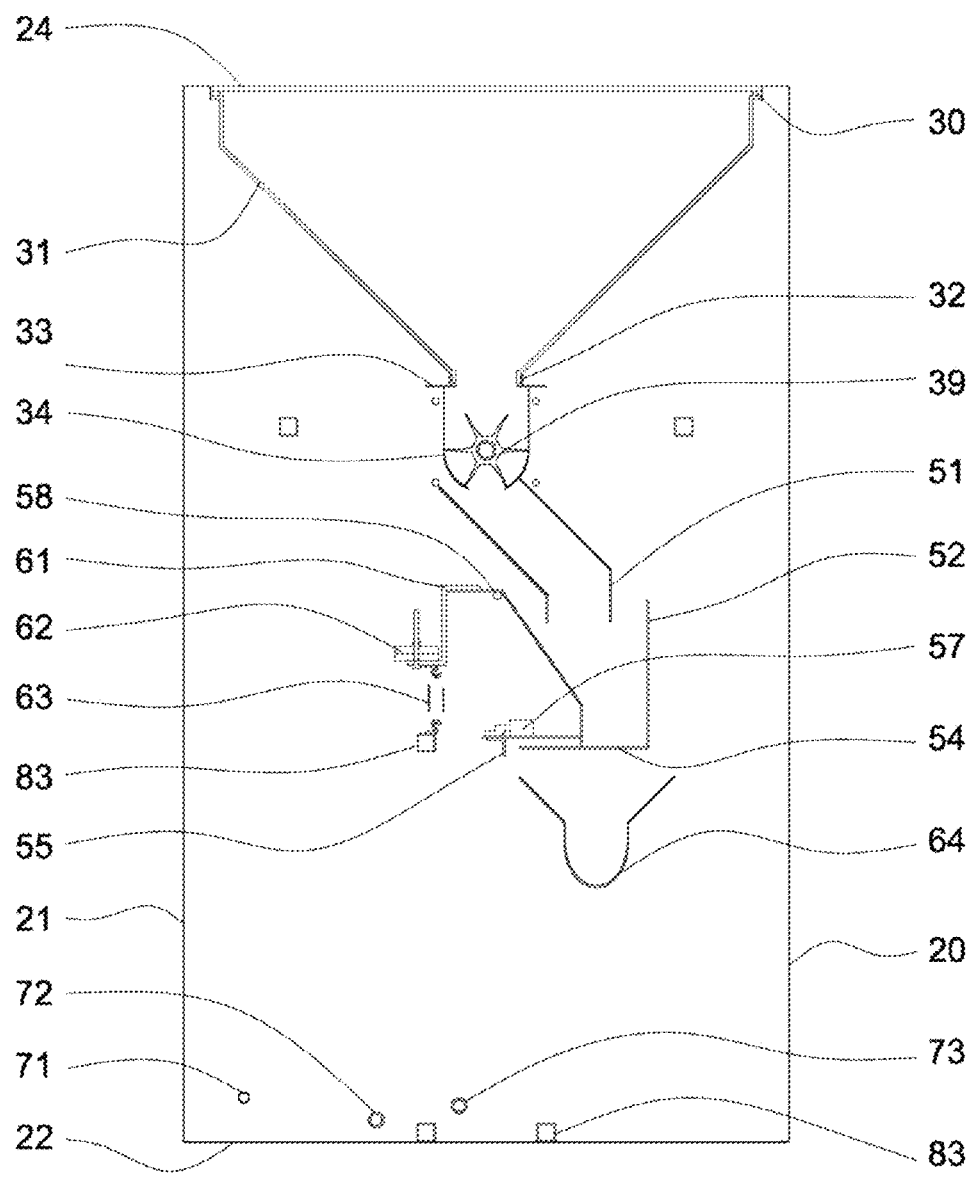
FIG. 8 is cross-sectional view of the apparatus of the present invention, taken parallel to the frontal face and through the centre of the hopper exit.

A sectional view taken parallel to the front of the device, through the centerline of the exit port of the hopper 31, is provided in FIG. 8. This view transects the feed distribution and weighing mechanisms in a direction that facilitates an explanation of the principle of operation of these systems. The loading of feed is performed by opening the top access cover 24 and filling the hopper 31.

The pelletized feed is conveyed into the delivery mechanism via gravity flow, but will be restricted from flowing into the delivery system chute 51 by the sealing action of the flexible rotor 39 against the curved walls of the delivery mechanism housing 34. Tests show the angle of the hopper 31 walls must be in excess of thirty five degrees to the horizontal and the hopper must be manufactured with a smooth finish, plastic being the material of choice, to ensure pelletized feed on the market will flow unassisted by vibration or any other means. The size of the exit from the hopper is also important and is preferably of the order of sixty five millimeters (approximately two and a half inches) to ensure free flow.

Rotation of the flexible rotor 39, by means of a delivery system motor 50 (not shown), moves an approximate quantity of feed per angular displacement to the bottom opening cut into the curved delivery mechanism housing 34. The feed falls by gravity into the delivery system chute 51 which must be maintained at above thirty five degrees to the horizontal to guarantee movement of the pelletized feed.

The delivered quantity per complete rotation is largely a factor of the geometry of the flexible rotor 39 and the curved portion of the mechanism housing 34. Pellet size and packing due to weight from above are also factors that affect accuracy. To increase the accuracy a weighting system is included.

Figure 11A:
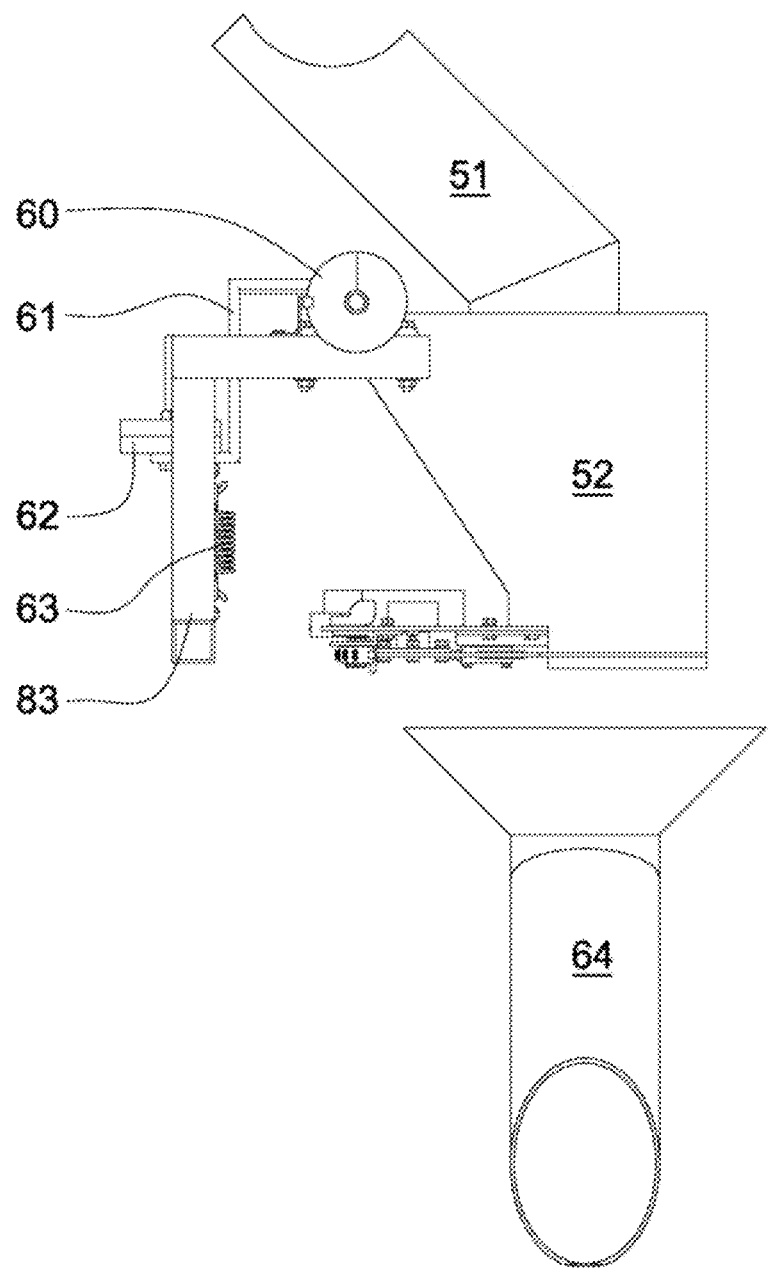
FIG. 11a is a side view of the weighting system of the present invention, as it would appear with no feed material present.
Figure 11B:
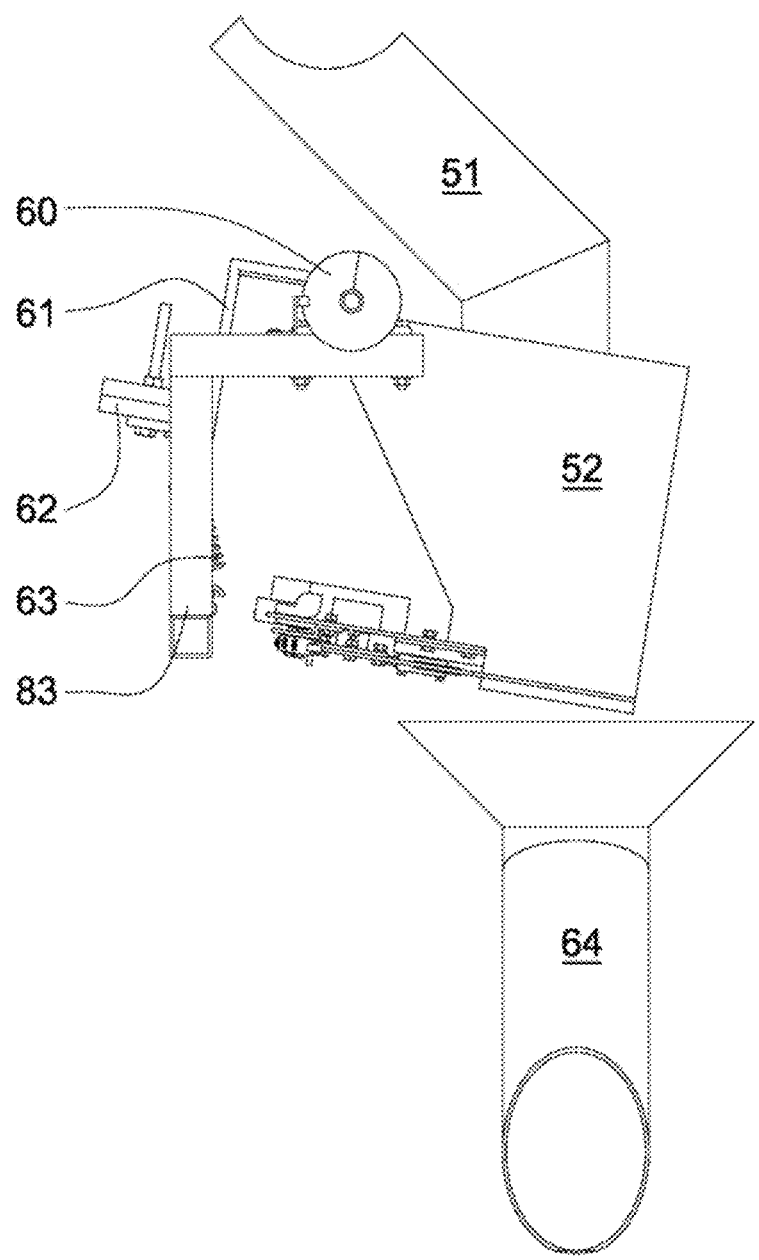
FIG. 11b is a side view of the weighting system of the present invention, as it would appear when filled with feed material.

The weighting system is based on the commonly used method of relating the extension of a spring to the force exerted once it is within its linear range. The scale basket 52 collects the feed via the delivery system chute 51. In the initial stages the scale release gate 54 is kept closed so the feed fills the basket 52. As this occurs, the basket 52 pivots about the scale pivot shaft 58 and with the weight of the feed being balanced by the force exerted by the extension of the scale counterbalance spring device 63 as illustrated in FIGS. 11a and 11b.

To achieve reasonable accuracy the spring constant, k, of the scale counterbalance spring device 63 must be relatively low. This would not be very accurate if the scale counterbalance spring device 63 had to support the weight of the scale balance assembly (scale basket 52, scale release gate actuator 57, scale release gate 54 and other devices on that side of the scale pivot shaft 58). A counter balance 61 is included to solve this problem with weights 62 added to perfectly balance the system when the scale basket 52 is empty.

Figure 9:
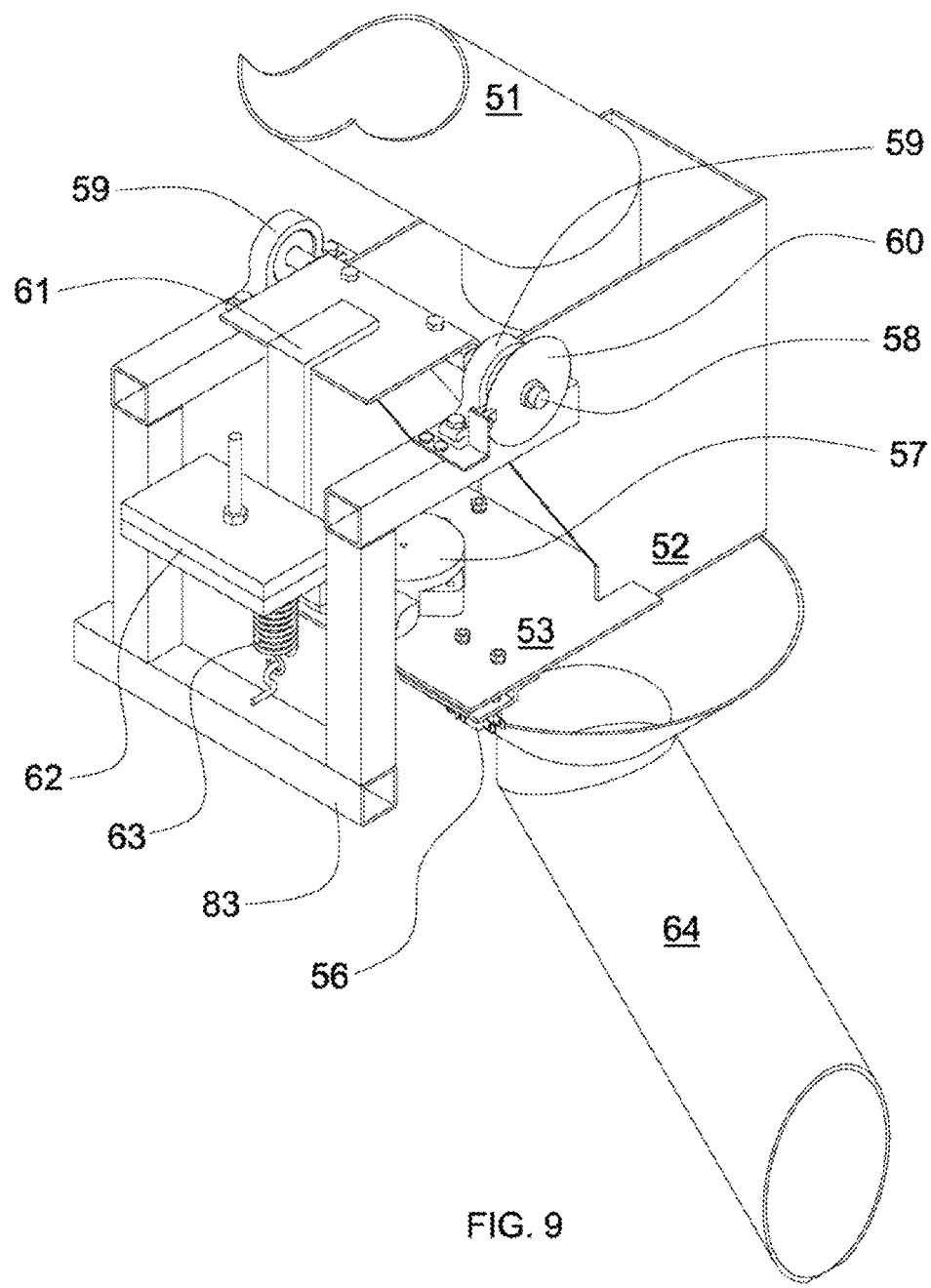
FIG. 9 is a perspective view of the feed weighting system of the present invention.

The accuracy of the weighting system is also affected by the resistance to rotation at the scale pivot shaft 58. Pillow bearings 59, visible in FIG. 9, are specified to reduce the effects of friction.

The angular rotation is directly related to the weight of the feed in the scale basket 52 hence measuring this attribute with a measuring device allows the circuit board with microprocessor controller 80 to calculate feed portions. An optical encoder 60 was chosen as the measuring device due to its accuracy. It is noted this can be replaced by a sensitive potentiometer.

Once the desired amount of feed is measured the circuit board with microprocessor controller 80 turns off the power to the delivery system motor 50 and turns on power to the scale gate motor 57. The scale gate motor 57 opens the scale release gate 54 until it comes in contact with the physical stop 55. At that point a limit switch 56 is activated and the power to the scale gate release motor 57 is stopped. The system stays in this position for a short period of time to allow all the feed to fall from the scale basket 52 into the flared end of the feed exit chute 64.

Once this is complete, the power to the scale gate release motor 57 is reversed and the scale release gate mechanism 54 is closed. Upon reaching the closed position the scale release gate mechanism 54 is prevented from further motion due to the shape of one end of the scale basket 52. At this point another limit switch 85 is activated and power to the scale gate release motor 57 is turned off.

Figure 10A:
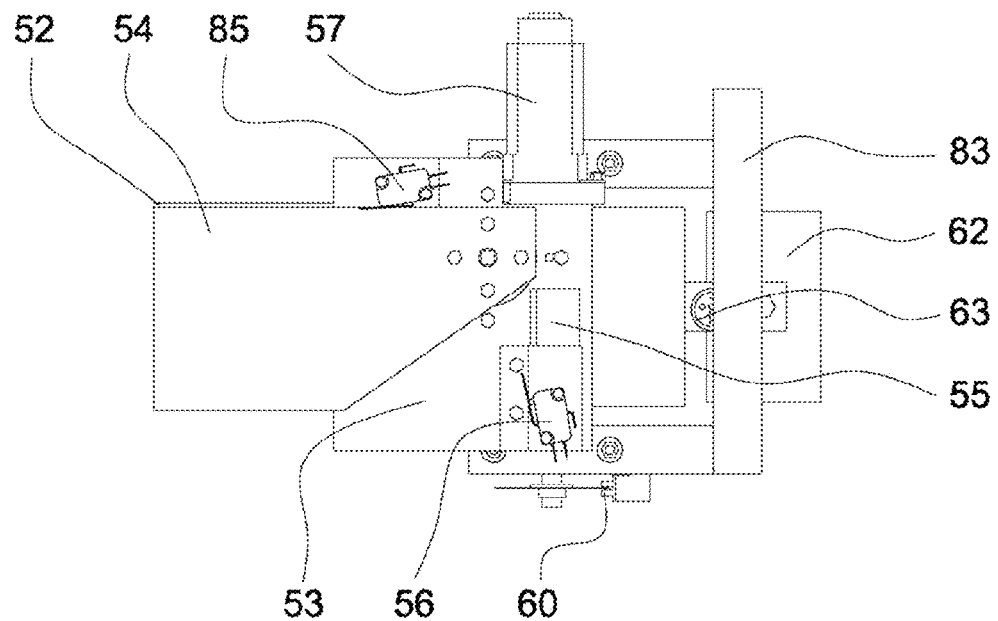
FIG. 10a is an underside view of the weighting system of the present invention, with the release gate closed.
Figure 10B:
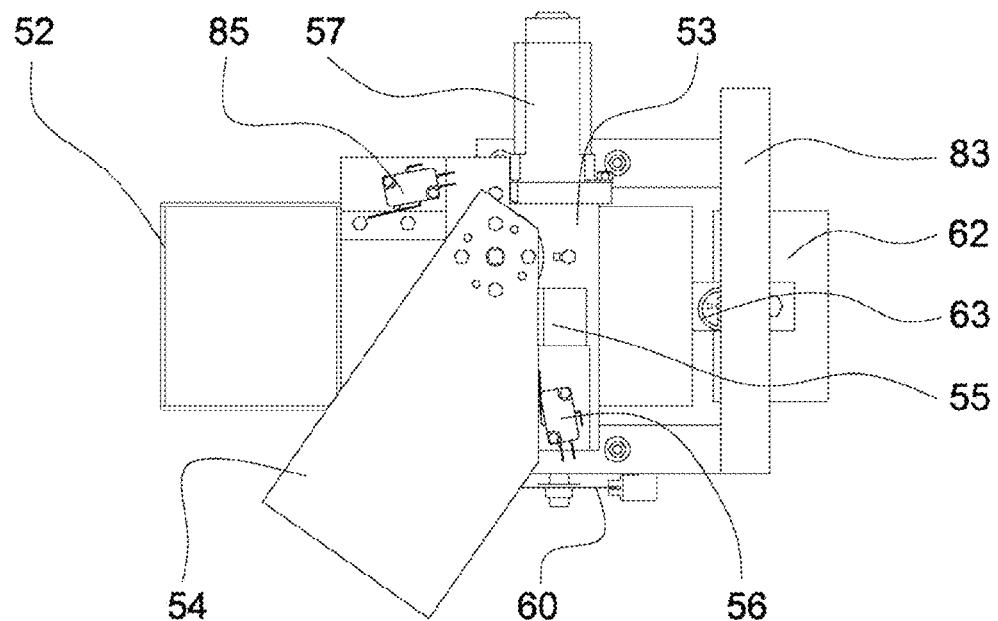
FIG. 10b is an underside view of the weighting system of the present invention, with the release gate open.

The open and closed positions of the scale release gate mechanism 54 and activation of the limit switches 56, 85 mentioned are illustrated in FIG. 10. Due to the action of the scale counterbalance spring device 63 the system will rebalance to the position status it was in prior to receiving feed.

An exploded perspective view of the pivot shaft 58 depicts pillow bearings 59 and the optical encoder 60. It is noted the scale shaft 58 is square in the central section to facilitate mounting on to the scale basket 52.

Figure 12A:
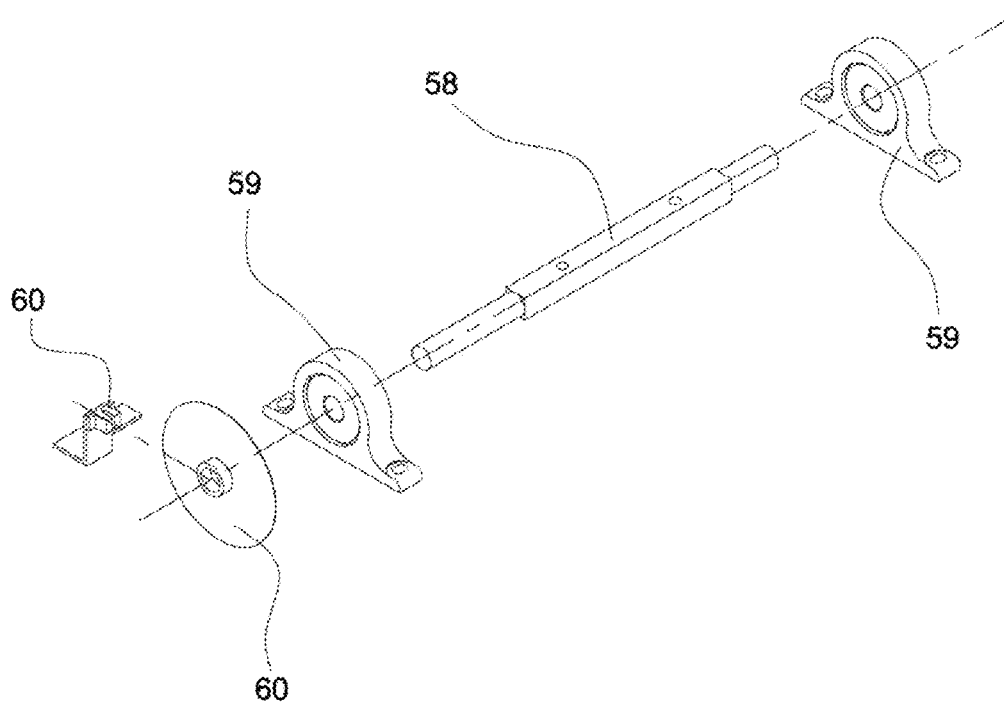
FIG. 12a is a fragmentary perspective view of the present invention's weighting system's pivotal shaft and support bearings.
Figure 12B:
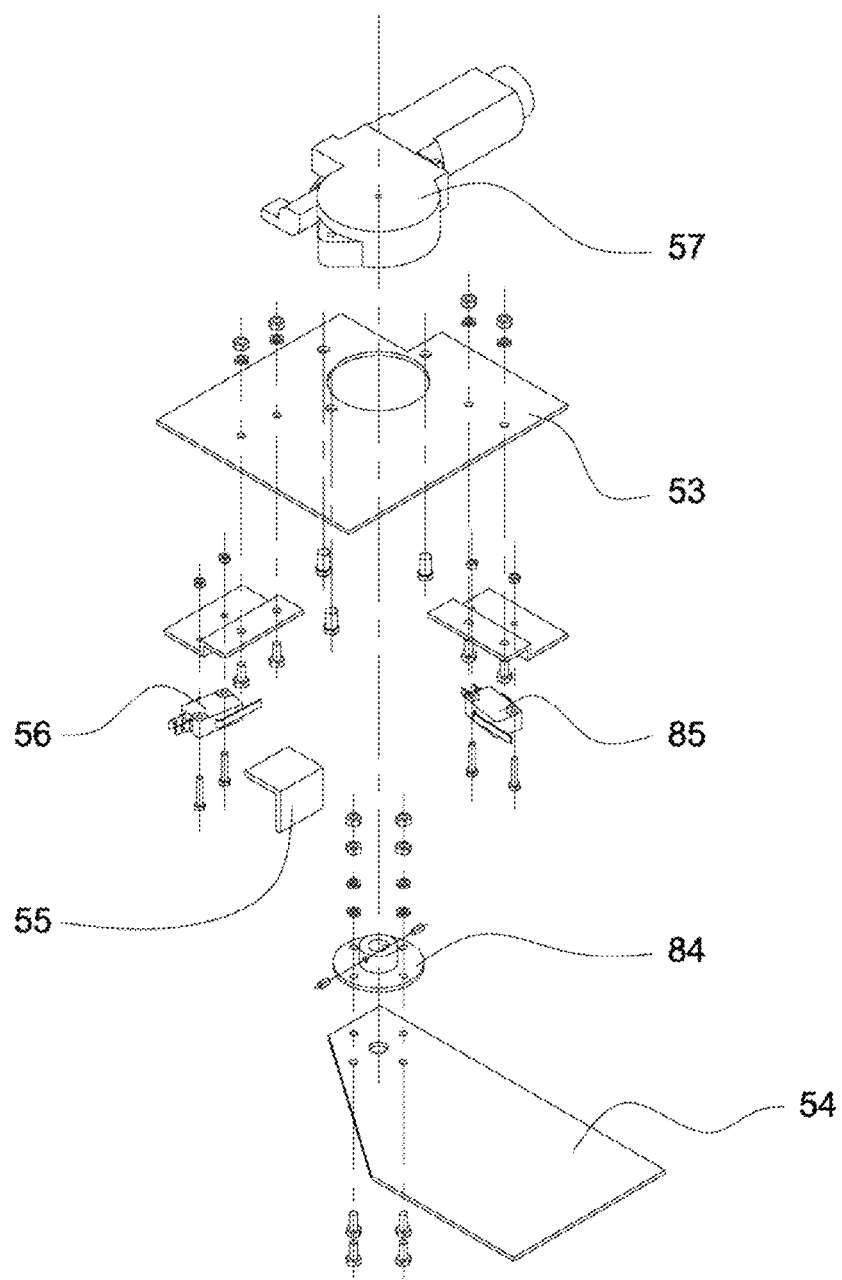
FIG. 12b is a fragmentary perspective view of the present invention's weighting system's release gate showing the motor, coupling, limit switches and physical stop.
Figure 13:
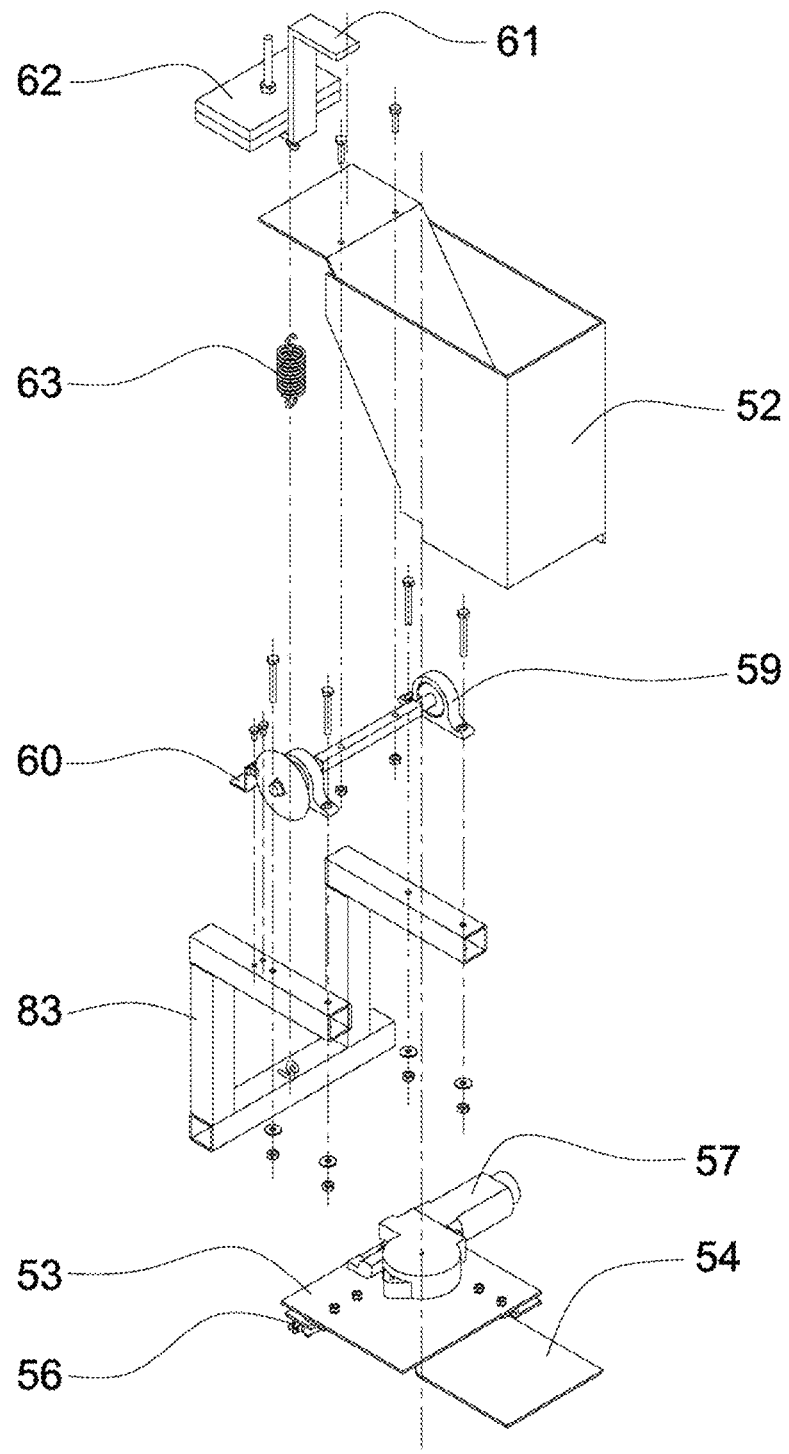
FIG. 13 is a fragmentary perspective view of the complete weighting system of the present invention.

In an exploded perspective view of the scale gate release system inclusive of the scale gate motor 57, scale gate motor plate 53, the limit switches 56, 85 and their mounts, the scale release gate physical stop 55, the scale gate motor coupling 84 and the scale gate 54 are visible. The scale release gate motor 57 is bolted on the scale motor mount plate 53 and is connected to the scale release gate 54 via a coupling 84. FIG. 13 provides an exploded perspective view of the entire weighting system with the two subsystems illustrated in FIG. 12a and FIG. 12b assembled.

It may be argued that the scale release gate 54 creates the shear plane when closing, that the flexible rotor 39 sought to avoid. This is not so, however, since the scale release gate 54 allows all pelletized feed to fall before it closes; hence there is nothing to shear. Obviously this principle cannot work when the storage is the hopper 31.

The microprocessor controller on the circuit board 80 is programmed with a lookup table that allows it to compare the on time of the delivery system motor 50 with the estimated feed delivered. If there is significant variation between the expected delivery system motor 50 on time and appropriate feedback from the scale optical encoder 60 the system alerts the operator of an error. This would normally be due to a lack of feed in the hopper 31, though it is possible that a motor or drive system failure would also result in triggering the alarm.

The delivery system motor 50 requires high torque to overcome resistance and a low rotation speed to allow gravity to act on the pelletized feed when it reaches the opening in the curved delivery mechanism housing 34. A motor with integrated gearing is ideal for this application. Similarly the scale gate motor 57 requires higher torque and lower revolutions per minute to perform its task and as such a motor with integrated gearing is also specified in this application. It is noted that a powerful solenoid could be used to activate the scale release gate 54 and would replace the need for the limit switches 56, 85 and physical stop 55.

The successful operation as described above is highly dependent on the flexibility of the rotor 39. If the rotor 39 is too rigid, the feed pellets will become wedged between its blades and the curved portion of the curved mechanism housing 34.

In this scenario the feed pellets can be crushed, the delivery system motor 50 can stall or some component in the drive train can fail. This was actually tested with stainless steel blades. Under the test conditions the motor consistently stalled in less than one complete revolution. On the other hand if the impeller is too flexible, it will deflect due to the weight of the pelletized feed above it and it will allow some to pass through especially if the device is shaken. The desired flexibility is achieved partly by the shape of the rotor 39 blades and partly by the material it is fabricated from. It is also noted that the materials of choice must be of feed grade. Some types of rubber and flexible plastic seem to be best suited for this application.

Figure 14A:
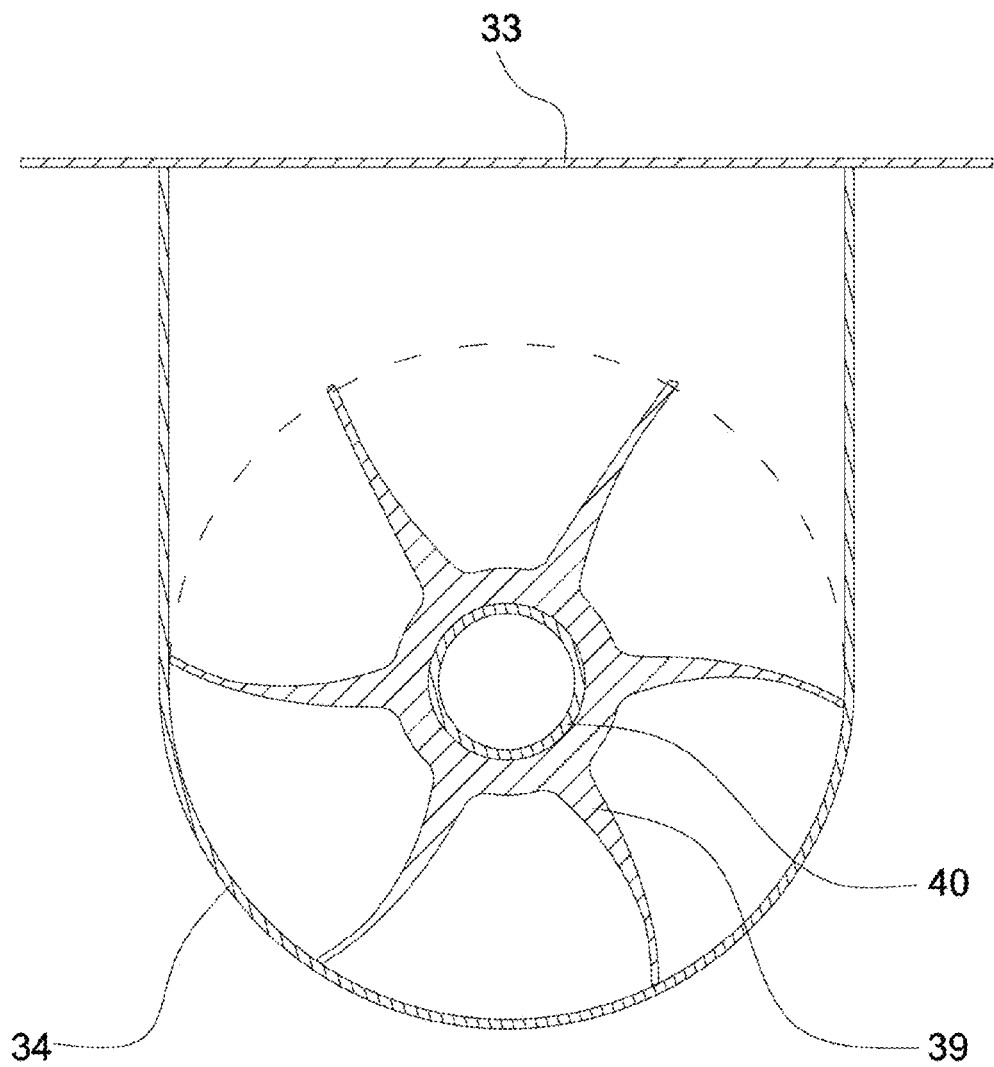
FIG. 14a is a sectional view of the rotor of the present invention, perpendicular to its length depicting the deflection of the splines, as they rotate within the confines of the housing.

FIG. 14a is a sectional view of the mechanism housing taken perpendicular to the axis of the rotor shaft 40 and close to one end so the openings on the delivery mechanism's top plate 33 and curved plate 34 are not visible. The rotor 39 blades are curved and angled in a manner to allow them to flex easily when they are rotated in the anticlockwise direction. It is also noted that the tip of the rotor 39 blades are angled and largely flat so that they become perpendicular to the curved mechanism housing 34 when flexed as illustrated.

The inherent resilience of the material and shape of the rotor 39 blade, allows it to wipe the curved mechanism housing 34, in a similar manner to the action of a wiper blade on a windshield. A dashed line shows the diameter of the curved mechanism housing 34 extended into the vertical portion. This helps to illustrate the slight straightening of the rotor 39 blades and thus extension above the dashed line, as they become unrestrained. It is noted that six blades were chosen so at least two will be sealing the opening at the bottom of the curved mechanism housing 34 at all times.

Figure 14B:
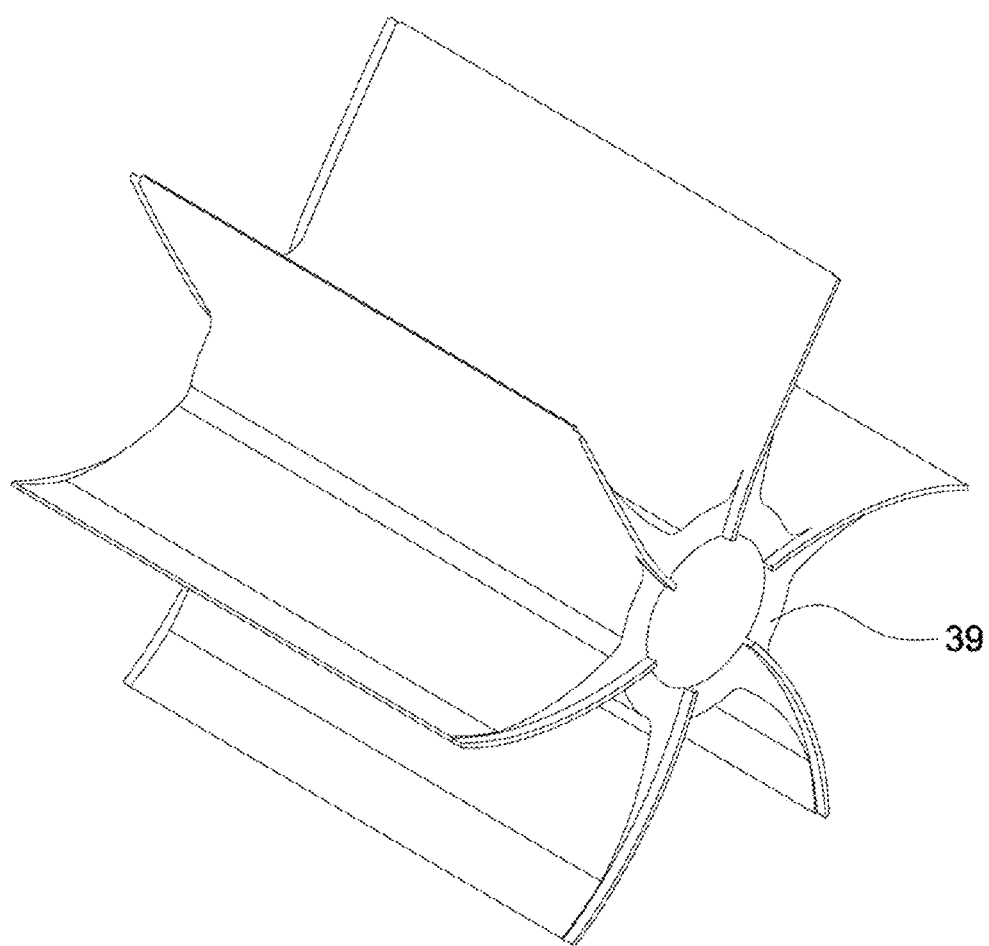
FIG. 14b is a perspective view of the rotor of the present invention, illustrating the wiper fins that clean the mechanism's housing during regular operation.
Figure 15:
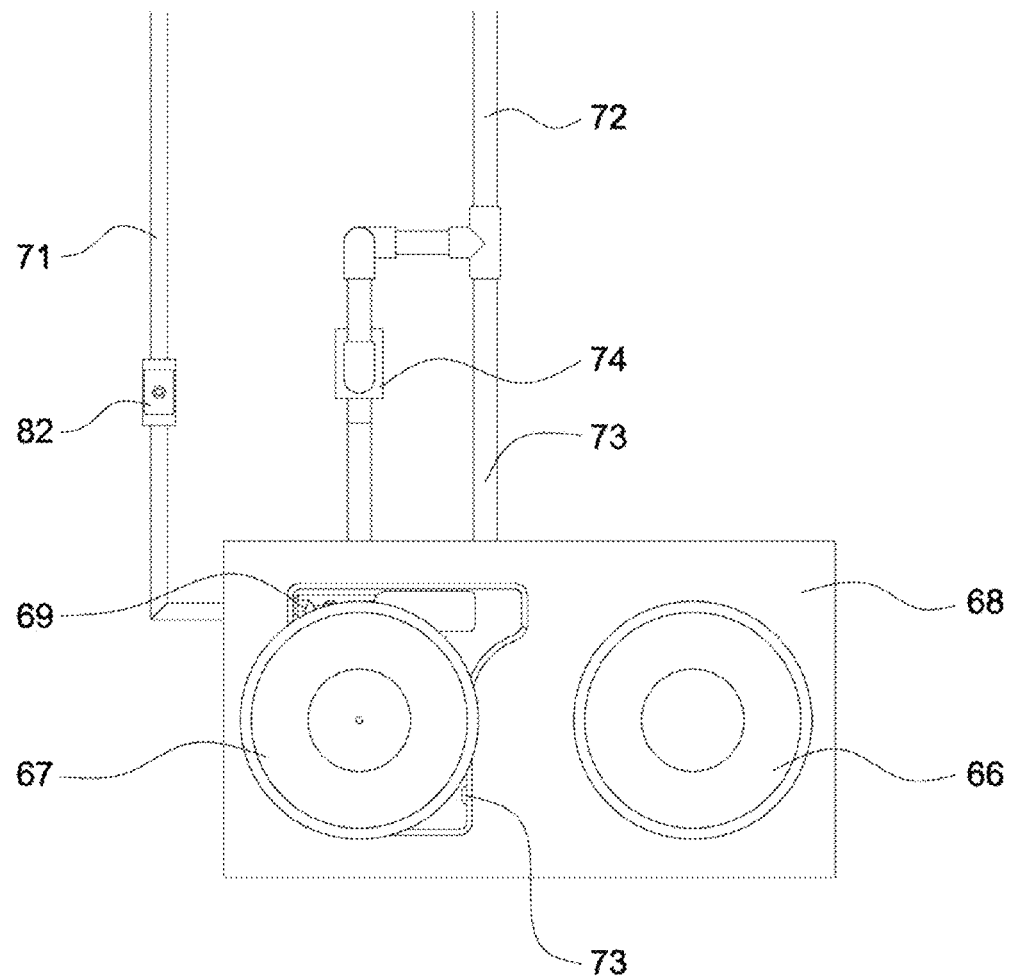
FIG. 15 is an overhead view of the watering system of the present invention.

A perspective view of the rotor 39 alone, reveals that thin wiper style fins are included on each blade, as illustrated in FIG. 14*b*, to allow the rotor 39 to wipe the flat side walls of the mechanism housing 35, 36. More importantly these fins ensure a thorough seal between the rotor 39 and mechanism housing 34 and thus prevent the intrusion of vermin and humidity; as such they are necessary to ensure the integrity of the pelletized feed stored in the hopper 31. It is noted that the size of the rotor 39 was determined by the size in the exit port of the hopper 31 which is slightly above the minimum required for free flow of the pelletized feed, presently on the market, under gravity.

A top down perspective view of the water system reveals that water is supplied via a plumbed mains connection 71 to the water tank 68 under the regulation of a float valve 69. An overflow 73 is included and plumbed to the drain connection 72 to facilitate the safe discharge of water should the float valve 69 fail. The drain connection 72 is plumbed directly to a small water pump 74.

Figure 18:
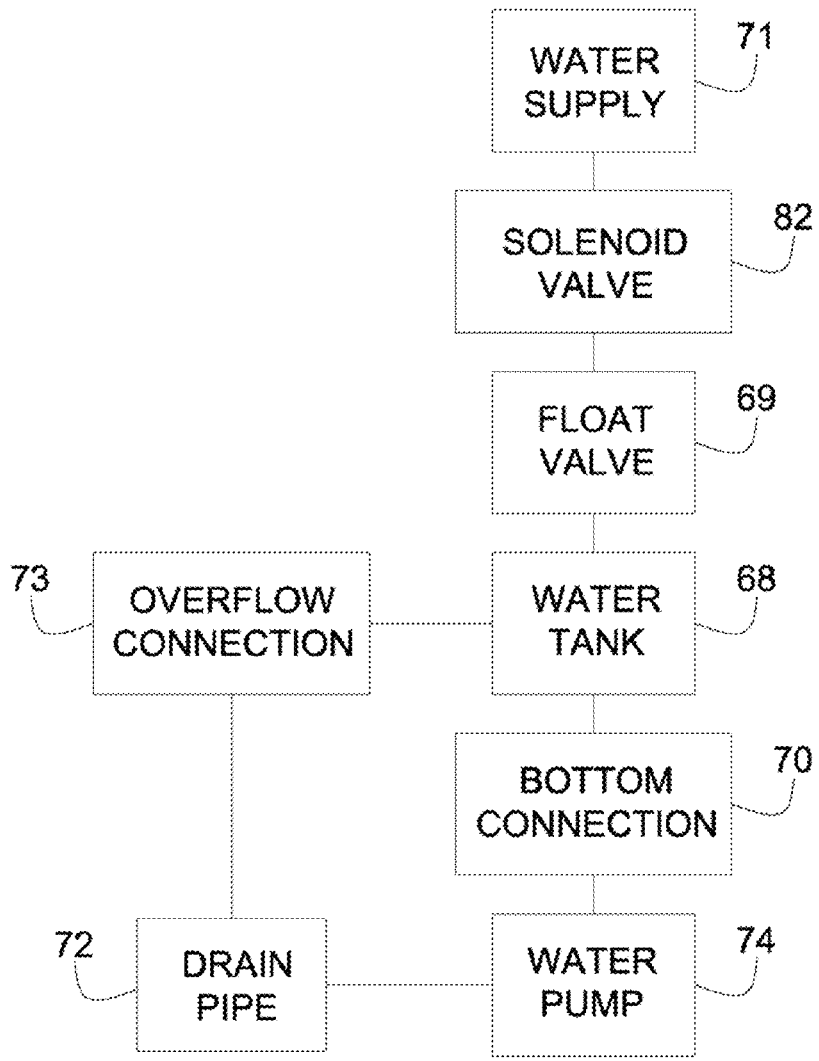
FIG. 18 shows a modular plumbing layout for the present invention.

The discharge from this water pump 74 is elevated to a level above the water tank 68 to keep the water from flowing through the pump 74 and out the drain connection 72 via gravity. The drain connection 72 exits the device at a low level to facilitate gravity discharge from the overflow 73. The plumbing connections described are represented in a modular format in FIG. 18.

Figure 3:
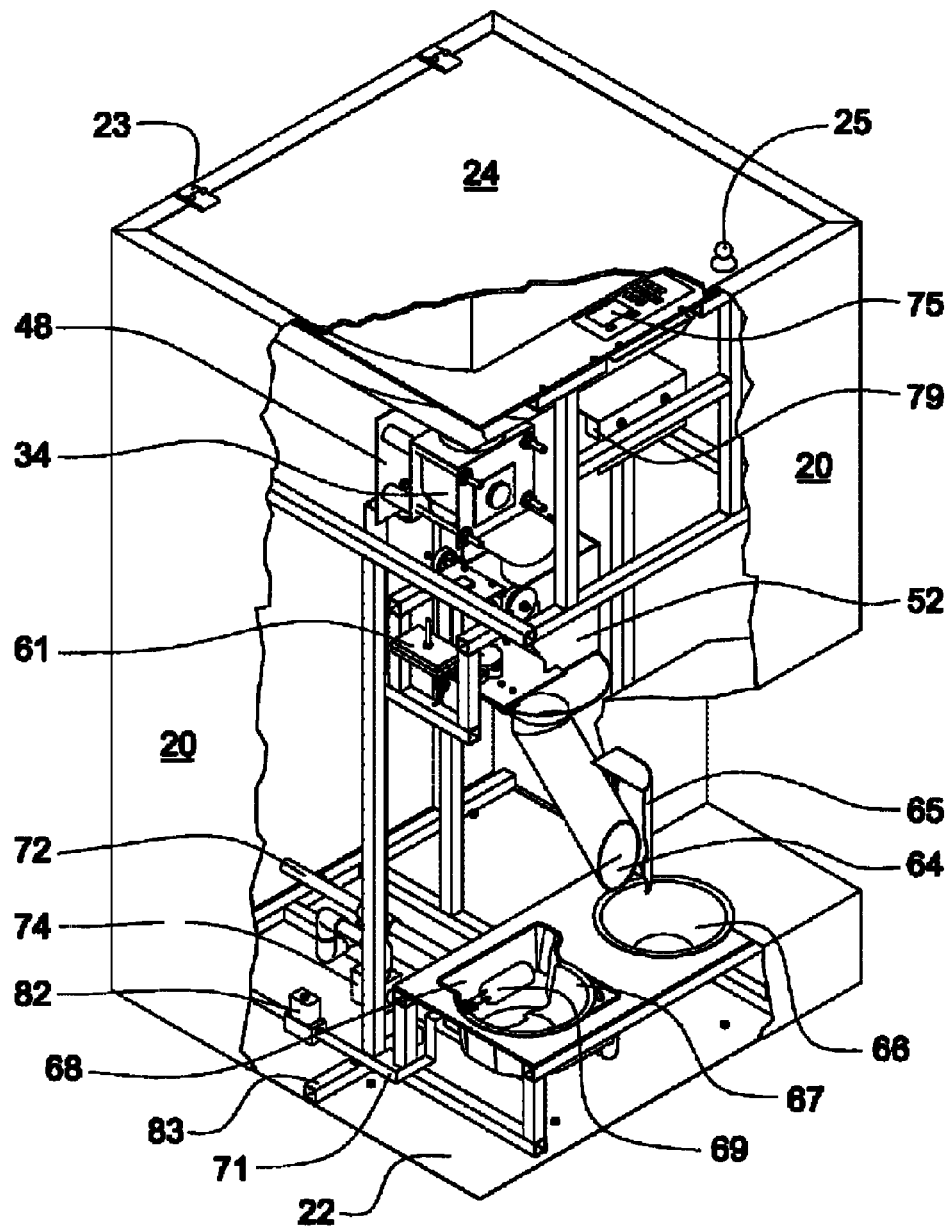
FIG. 3 is a fragmentary perspective view of the preferred embodiment of the present invention.
Figure 4:
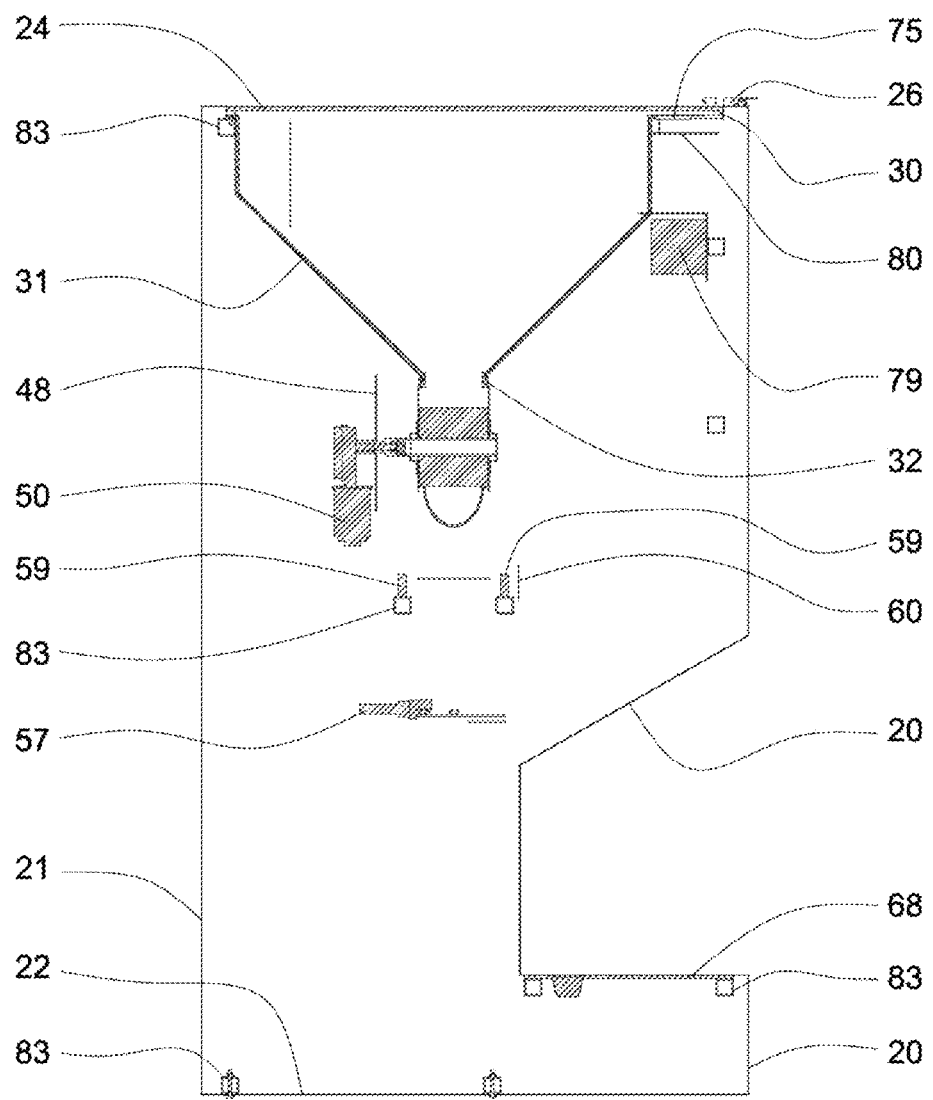
FIG. 4 is a cross-sectional view of the present invention, taken perpendicular to the frontal face and through the centre line of the apparatus.
Figure 16:
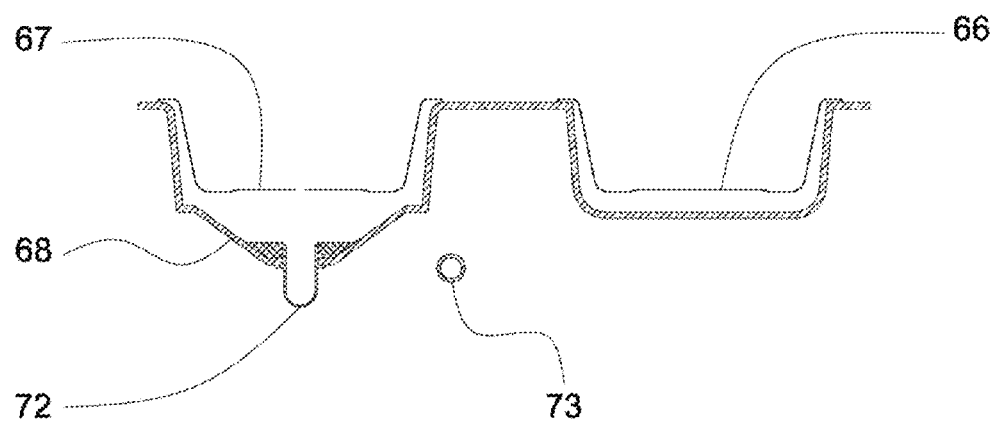
FIG. 16 is a cross-sectional view of the watering system of the present invention, taken parallel to the front face of the apparatus and through the centre line of the water bowl and feed receptacle.

FIG. 16 provides a sectioned view of the water system taken through the centerline of the water 67 and feed bowls 66. The tapered base of the water tank 68 assists in the funneling of feed particulate to the drain connection 72. The small hole required to allow water to flow from the water tank 68 into the water bowl 67 is visible. The chute shield 65, best illustrated in FIG. 3, is removable allowing the feed bowl 66 to be removed for cleaning. The water tank 68 is shaped in such a manner that a partitioned portion of it, that remains dry, forms a finisher to hide the internal mechanisms of the device when the feed bowl 66 is removed for cleaning.

The wet compartment of the water tank 68 is sized as small as possible to accommodate the water bowl 67 and float valve 69. This is important since the water is disposed of at least four times a day. The purpose of this is to minimize the feed particulate and other contaminants in the water that inevitably builds up as the animal consumes from the water bowl 67. This approach is critical in providing a clean water supply to the animal thus ensuring good health. The cleaning process mentioned above involves the input solenoid valve 82 shutting off the mains water supply connection 71 while the water pump 74 empties the water tank 68.

After a fixed period of time, determined empirically, the water pump 74 is turned off and the solenoid valve 82 is opened to allow the water tank 68 to refill. The process is repeated to achieve best results and thus two discharges of the water represent one cycle. The cycle is repeated four times daily as mentioned previously. Of course, the electrical control of the solenoid valve 82 and water pump 74 occurs automatically via the microprocessor controller on the circuit board 80.

Figure 17:
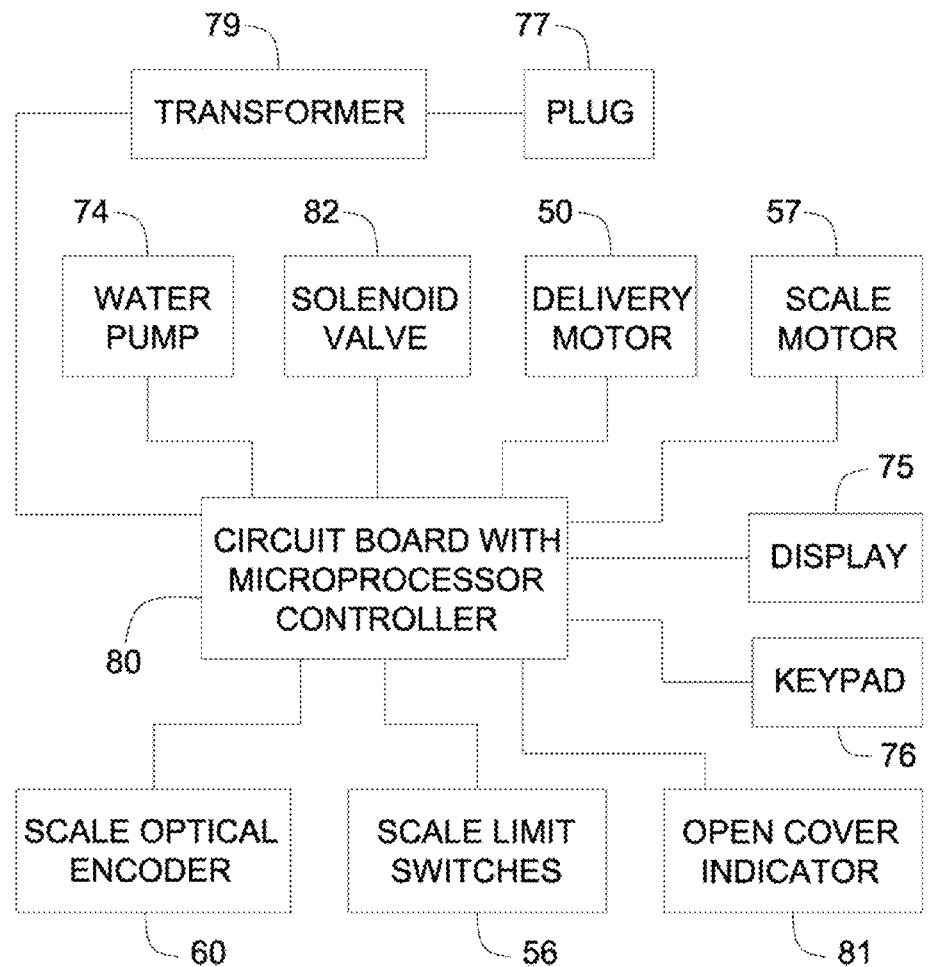
FIG. 17 shows a modular electrical layout for the present invention.

FIG. 17 provides a modular representation of the electrical system in the automatic animal feeding and watering device. The microprocessor controller on the circuit board 80 is the key element that makes the automatic functionality possible. User interface is achieved through the incorporation of a keypad 76 for input and a display 75 for feedback. Through this interface the user is guided to set the current date and time, feeding schedules and quantities.

The microprocessor controller 80 utilizes the user settings and a lookup table, based on empirical data, to determine the angular displacement, as measured by the scale optical encoder 60, that corresponds to the volume of food desired.

The water pump 74 and solenoid valve 82 are also controlled by the microprocessor controller 80. This action is automatic and requires no user setting. Power to the system is supplied by the mains via an electrical connection with a standard plug 77 and is regulated via a transformer 79 to the appropriate voltage for the microprocessor controller 80.

It is pointed out that although the present invention has been shown and described with reference to a particular embodiment, nevertheless various changes and modifications, apparent to one skilled in the art to which the present invention pertains, are deemed to lie within the purview of the invention and may be seen when taken together with the accompanying drawings and the Claims.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

REFERENCE NUMBER LISTING

| | |
|---|---|
| 20 | Body, Front & Sides |
| 21 | Rear Body Panel |
| 22 | Bottom Body Panel |
| 23 | Cover Hinge |
| 24 | Top Access Cover |
| 25 | Cover Handle |
| 26 | Cover Latch |
| 27 | Wall Mount Bracket, Device |
| 28 | Wall mount bracket, wall |
| 29 | Leveling feet |
| 30 | Rubber seal |
| 31 | Hopper |
| 32 | Delivery Mechanism housing top ring |
| 33 | Delivery Mechanism housing top |
| 34 | Delivery Mechanism housing curved |
| 35 | Delivery Mechanism housing opp. motor |
| 36 | Delivery Mechanism housing motor side |
| 37 | Delivery Mechanism bolts |
| 38 | Delivery Mechanism bolts spacer |
| 39 | Rotor |
| 40 | Rotor shaft |
| 41 | Bushing |
| 42 | Thrust bushing |
| 43 | Bushing Housing |
| 44 | Thrust bushing housing |
| 45 | Rotor shaft coupling |
| 46 | Rotor shaft key |
| 47 | Delivery Motor shaft coupling |
| 48 | Delivery Motor mount plate |
| 49 | Delivery Motor mount plate bolts |
| 50 | Delivery System Motor |
| 51 | Delivery System Chute |
| 52 | Scale basket |
| 53 | Scale motor mount plate |
| 54 | Scale release gate |
| 55 | Scale release gate physical stop |
| 56 | Scale release gate limit switches, activated when open |
| 57 | Scale Release Gate Motor |
| 58 | Scale pivot shaft |
| 59 | Scale pillow bearings |
| 60 | Scale optical encoder |
| 61 | Scale counter balance |
| 62 | Scale counter balance weights |
| 63 | Scale counter balance spring |

-continued

| | |
|---|---|
| 64 | Food Exit Chute |
| 65 | Chute shield |
| 66 | Feed bowl |
| 67 | Water bowl |
| 68 | Water tank |
| 69 | Float valve |
| 70 | Water tank bottom connection |
| 71 | Water supply connection |
| 72 | Water drain connection |
| 73 | Overflow connection |
| 74 | Water pump |
| 75 | LCD display |
| 76 | Keypad |
| 77 | Electrical Connection and Plug |
| 78 | Electrical connection gland |
| 79 | Transformer |
| 80 | Circuit board with microprocessor controller |
| 81 | Open cover switch |
| 82 | Solenoid valve |
| 83 | Internal frame |
| 84 | Scale motor to release gate coupling |
| 85 | Scale release gate limit switches, activated when closed |

What is claimed is:

1. An automatic animal feed dispensing apparatus for supplying pelletized feed at selected times, comprising:
   a) a hopper for storing pelletized feed, having an opening at a bottom of the hopper;
   b) a delivery mechanism underneath the hopper, comprising:
      i) a mechanism housing under the opening at the bottom of the hopper having an open top for accepting feed by gravity from the opening at the bottom of the hopper, comprising a curved plate having a curved lower portion having a diameter centered on an axis of rotation, joined to two vertical upper portions, and two flat side walls enclosing the curved plate, the curved plate having an opening in the curved portion at a bottom of the mechanism housing;
      ii) at least one flexible rotor in the mechanism housing rotatable about the axis of rotation, the rotor having a plurality of blades having sides sealing against the flat side walls of the mechanism housing and having a length related to the diameter of the curved lower portion of the curved plate such that tips of the blades are constrained by and seal against the curved lower portion of the curved plate of the mechanism housing, blocking flow of feed past the rotor to the opening at the bottom of the mechanism housing, the blades being sufficiently rigid to seal against the curved lower portion of the curved plate, but also sufficiently flexible to deflect to avoid crushing of feed trapped between the blades and the curved lower portion of the curved plate while the rotor is in motion;
      iii) a gravity flow delivery chute having an upper end below the opening at the bottom of the mechanism housing, and an open lower end;
      iv) a motor for rotation of the rotor, coupled to the flexible rotor such that the rotation of the rotor moves a quantity of feed per angular displacement through the opening at the bottom of the mechanism housing into the upper end of the delivery chute; and
   c) a weighting system at the open lower end of the gravity flow delivery chute for metering the feed, comprising:
      i) a scale basket assembly pivoting about a scale pivot shaft, comprising:
         A) a scale basket having an open top located under the open lower end of the gravity flow delivery chute such that feed from the gravity flow delivery chute flows into the open top of the scale basket; and
         B) a release gate at a bottom of the scale basket with a release gate actuator having at least one input, the feed being retained in the scale basket by the release gate when the release gate is closed, and the feed flowing out of the scale basket by gravity when the release gate actuator opens the release gate;
      ii) a counterbalance coupled to the scale basket assembly in an opposed position about the scale pivot shaft, such that the scale basket assembly is balanced about the scale pivot shaft when empty;
      iii) a spring coupled to the scale basket assembly, opposing rotation of the scale balance assembly about the scale pivot shaft, such that as feed flows into the scale basket, the scale basket assembly rotates about the scale pivot shaft due to a weight of the feed, and an angular rotation of the scale basket about the pivot is related to the weight of the feed in the scale basket; and
      iv) a measuring device having at least one output coupled to the scale basket for measuring the angular rotation of the scale basket about the pivot shaft; and
   d) a controller having at least one output coupled to the motor, at least one input coupled to the at least one output of the measuring device of the weighting system, and at least one output coupled to the at least one input of the release gate actuator, the controller being set such that at selected times the controller activates the motor, causing feed to flow by gravity from the hopper through the delivery mechanism, and further such that when the measuring device measures an angular rotation of the scale basket representing a selected weight of feed in the basket, the controller stops the motor and opens the release gate, dispensing the selected weight of feed from the weighing system.

2. The apparatus of claim 1, in which the hopper comprises walls having a smooth finish, the lower walls converging inwardly and downwardly inclining toward the opening at the bottom of the hopper at an angle of at least thirty-five degrees to the horizontal.

3. The apparatus of claim 1, wherein the opening at the bottom of the hopper is at least sixty-five millimeters.

4. The apparatus of claim 1, further comprising a feed bowl for feeding an animal, located such that feed flows from the delivery mechanism into the feed bowl.

5. The apparatus of claim 1, in which the rotor has at least six blades.

6. The apparatus of claim 1, in which the blades curve in a direction that assists deflection of the blades as they become constrained by the curved walls of the mechanism housing during rotation.

7. The apparatus of claim 1, in which the blades taper in thickness from a center of the rotor outward toward the blade tips.

8. The apparatus of claim 1, in which the blades have flat edges at the blade tips, the flat edges changing orientation to become substantially perpendicular to the curved walls of the mechanism housing under deflection as the blades are constrained by the curved walls during rotation of the rotor.

9. The apparatus of claim 1, in which the blades of the rotor further comprise thin wiper fins on the sides of the blades for wiping and providing a seal against the flat side walls of the mechanism housings.

10. The apparatus of claim 1, in which the measuring device comprises an optical encoder.

11. The apparatus of claim 1, in which the measuring device comprises a potentiometer.

12. The apparatus of claim 1, in which the controller comprises:
- a microprocessor having a plurality of inputs and outputs;
- a man-machine interface for communication with a user, comprising a user input coupled to an input of the microprocessor and an indicator output.

13. The apparatus of claim 12, in which the user input comprises a keypad.

14. The apparatus of claim 12, in which the indicator output comprises a screen display.

15. The apparatus of claim 1, further comprising a water delivery system comprising a water tank for supplying drinking water to an animal, having an adjustable float valve coupled to a water line for connection to a water source, such that the float valve controls water flow from the water source to the tank to maintain a water level in the water tank.

16. The apparatus of claim 15, in which the water tank comprises a water bowl in the water tank, having at least one opening at a bottom, the water bowl covering at least the float valve to prevent access by the animal to the float valve.

17. The apparatus of claim 15, in which the water delivery system further comprises:
- a) an input valve in the water line, coupled to an output of the controller;
- b) a bottom drain in the water tank; and
- c) a drain pump coupled to the bottom drain and an output of the controller;

the controller being set at selected intervals to close the input valve, operate the drain pump for a selected time to drain the water tank, then open the input valve to allow the water tank to refill to a level set by the float valve, such that water and contaminants in the water tank are periodically removed and replaced with clean water, providing clean water to the animal.

18. The apparatus of claim 17, in which the water tank comprises a water bowl in the water tank, having at least one opening at a bottom, the water bowl covering at least the float valve to prevent access by the animal to the float valve.

* * * * *